United States Patent
Caola et al.

(10) Patent No.: US 8,881,225 B1
(45) Date of Patent: Nov. 4, 2014

(54) SYSTEMS AND METHODS FOR MANAGING PARENTAL CONTROLS

(75) Inventors: Andrew Caola, West Boylston, MA (US); Adam Schepis, Milford, MA (US)

(73) Assignee: Symantec Corporation, Mountain View, CA (US)

(*) Notice: Subject to any disclaimer, the term of this patent is extended or adjusted under 35 U.S.C. 154(b) by 315 days.

(21) Appl. No.: 13/364,286

(22) Filed: Feb. 1, 2012

(51) Int. Cl.
*H04L 29/06* (2006.01)

(52) U.S. Cl.
USPC ...... 726/1; 726/26; 726/27; 726/28; 709/224; 709/225

(58) Field of Classification Search
CPC .......... G06F 21/6209; G06F 17/30867; H04N 21/4751; H04N 21/4532; H04N 21/252; H04N 21/4667; H04L 9/32; H04L 12/24; H04H 60/33; H04H 60/45; H04H 60/65
USPC ................................. 726/26–28; 709/224–225
See application file for complete search history.

(56) References Cited

U.S. PATENT DOCUMENTS

| | | | |
|---|---|---|---|
| 6,570,610 B1 | 5/2003 | Kipust | |
| 8,281,366 B1 | 10/2012 | McCorkendale et al. | |
| 2003/0163811 A1* | 8/2003 | Luehrs | 725/25 |
| 2006/0218575 A1* | 9/2006 | Blair | 725/28 |
| 2006/0242424 A1* | 10/2006 | Kitchens et al. | 713/183 |
| 2008/0148310 A1* | 6/2008 | Strickland | 725/30 |
| 2012/0173699 A1* | 7/2012 | Niemela | 709/224 |

OTHER PUBLICATIONS

Aladdin Knowledge Systems Ltd.; eToken Pro Anywhere—Secure Access to Your Digital Identity and Information; http://www.aladdin.com/etoken/devices/pro-anywhere.aspx, as accessed Aug. 25, 2009.
Bruce McCorkendale et al.; Systems and methods for Using Guardian Proximity to Control Computing Activities of Children; U.S. Appl. No. 12/579,093, filed Oct. 14, 2009.

* cited by examiner

*Primary Examiner* — Carl Colin
*Assistant Examiner* — Mohammad A Siddiqi
(74) *Attorney, Agent, or Firm* — ALG Intellectual Property, LLC

(57) ABSTRACT

A method for managing parental controls may include enabling real-time collaboration between a child and a guardian of the child to manage one or more parental control policies by 1) initiating a collaborative parental-control-management session between the child and the guardian, 2) during the collaborative parental-control-management session, recording actions the child performs on a first computing system, 3) as the child performs the actions, streaming a representation of the actions of the child to a second computing system, 4) using the representation of the actions of the child to enable, at the second computing system, a guardian of the child to view the actions of the child as the actions occur, and 5) during the collaborative parental-control-management session, modifying the one or more parental controls. Various other methods, systems, and computer-readable media are also disclosed.

20 Claims, 6 Drawing Sheets

SYSTEMS AND METHODS FOR MANAGING PARENTAL CONTROLS

BACKGROUND

Children increasingly use computers in their everyday activities and may access a variety of content through computers. A parent or an organization may deem some content inappropriate for a child and may wish to prevent that child from accessing such content.

If a parent deems computer-accessible content inappropriate, the parent may use parental-control software to block a child from accessing the content's source (e.g., a computer application or a website). However, it may be difficult or time-intensive for a parent to ascertain whether a particular source should be blocked. The ever-growing number of available sources of content may multiply this burden, which may make the parent's task of managing parental-control software unduly difficult.

Parental-control-software vendors may make content gatekeeping quicker and easier for parents by allowing them to automatically block content sources that the vendors determine are inappropriate. A parental-control-software vendor may use various methods to flag inappropriate content. For example, a parental-control-software vendor may provide blacklists to which parents may subscribe. However, a blacklist may result in too many false negatives and false positives. For example, a blacklist may include a content source with valuable content that many parents would want open to their children. The same blacklist may fail to cover certain content sources that many parents would want to block.

In addition to, or instead of, blacklists, parental-control software may use heuristics (e.g., keyword detection) to guess whether content is inappropriate for a child. However, this method may suffer from the same fundamental defects as blacklists: too many false negatives and false positives. For example, a keyword that usually signals inappropriate content may be benign in some contexts, and some inappropriate content may contain no signaling keywords. What is needed, therefore, is a more efficient and effective mechanism for managing parental controls.

SUMMARY

As will be described in greater detail below, the instant disclosure generally relates to systems and methods for managing parental controls. For example, a method for managing parental controls may include enabling real-time collaboration between a child and a guardian of the child to manage one or more parental control policies by 1) initiating a collaborative parental-control-management session between the child and the guardian, 2) during the collaborative parental-control-management session, recording actions the child performs on a first computing system, 3) as the child performs the actions, streaming a representation of the actions of the child to a second computing system, 4) using the representation of the actions of the child to enable, at the second computing system, the guardian of the child to view the actions of the child as the actions occur, and 5) during the collaborative parental-control-management session, modifying the one or more parental control policies.

In some embodiments, modifying the one or more parental control policies may include receiving, at the second computing system, feedback from the guardian about the actions of the child and using the feedback from the guardian to modify the one or more parental control policies. Additionally or alternatively, modifying the one or more parental control policies may include changing the one or more parental control policies such that the one or more parental control policies are more permissive while the guardian of the child views the actions of the child on the second computing system.

According to at least one embodiment, initiating the collaborative parental-control-management session between the child and the guardian may include receiving, at the first and/or second computing systems, a request to initiate the collaborative parental-control-management session and, in response to the request, pairing the first computing system with the second computing system. In such embodiments, pairing the first computing system with the second computing system may include authenticating the guardian and the child before initiating the collaborative parental-control-management session. Additionally or alternatively, pairing the first computing system with the second computing system may include at least one of establishing Bluetooth network communications between the first and second computing systems, establishing WIFI network communications directly between the first and second computing systems such that the first and second computing systems communicate directly with each other without sending communications through a WIFI router, and/or establishing near-field communications between the first and second computing systems. In some embodiments, the method may also include terminating the collaborative parental-control-management session when the first and second computing systems are separated by more than a predetermined distance.

According to various embodiments, streaming the representation of the actions of the child to the second computing system may include sending log data that tracks the actions of the child to the second computing system. In certain embodiments, using the representation of the actions of the child to enable the guardian of the child to view the actions of the child as the actions occur may include enabling the guardian to view, via the second computing system, at least a portion of a screen of the first computing system. In various embodiments, modifying the one or more parental control policies may include at least one of changing the one or more parental control policies and creating the one or more parental control policies.

In one embodiment, a system for implementing the above-described method may include 1) a device pairing module programmed to initiate a collaborative parental-control-management session between the child and the guardian, 2) a tracking module programmed to, during the collaborative parental-control-management session, record actions the child performs on a first computing system, 3) a communication module programmed to, as the child performs the actions, stream a representation of the actions of the child to a second computing system, 4) a display module programmed to use the representation of the actions of the child to enable, at the second computing system, the guardian of the child to view the actions of the child as the actions occur, 5) a parental-control configuration module programmed to, during the collaborative parental-control-management session, modify the one or more parental control policies, and 6) at least one processor configured to execute the device pairing module, the tracking module, the communication module, the display module, and the parental-control configuration module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to enable real-time collaboration between a child and a guardian of the child to manage one or more parental control policies by 1) initiating a collaborative parental-control-management session between the child and the guardian, 2) during the collaborative parental-control-management session, recording actions the child performs on a first computing system, 3) as the child performs the actions, streaming a representation of the actions of the child to a second computing system, 4) using the representation of the actions of the child to enable, at the second computing system, the guardian of the child to view the actions of the child as the actions occur, and 5) during the collaborative parental-control-management session, modifying the one or more parental control policies Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
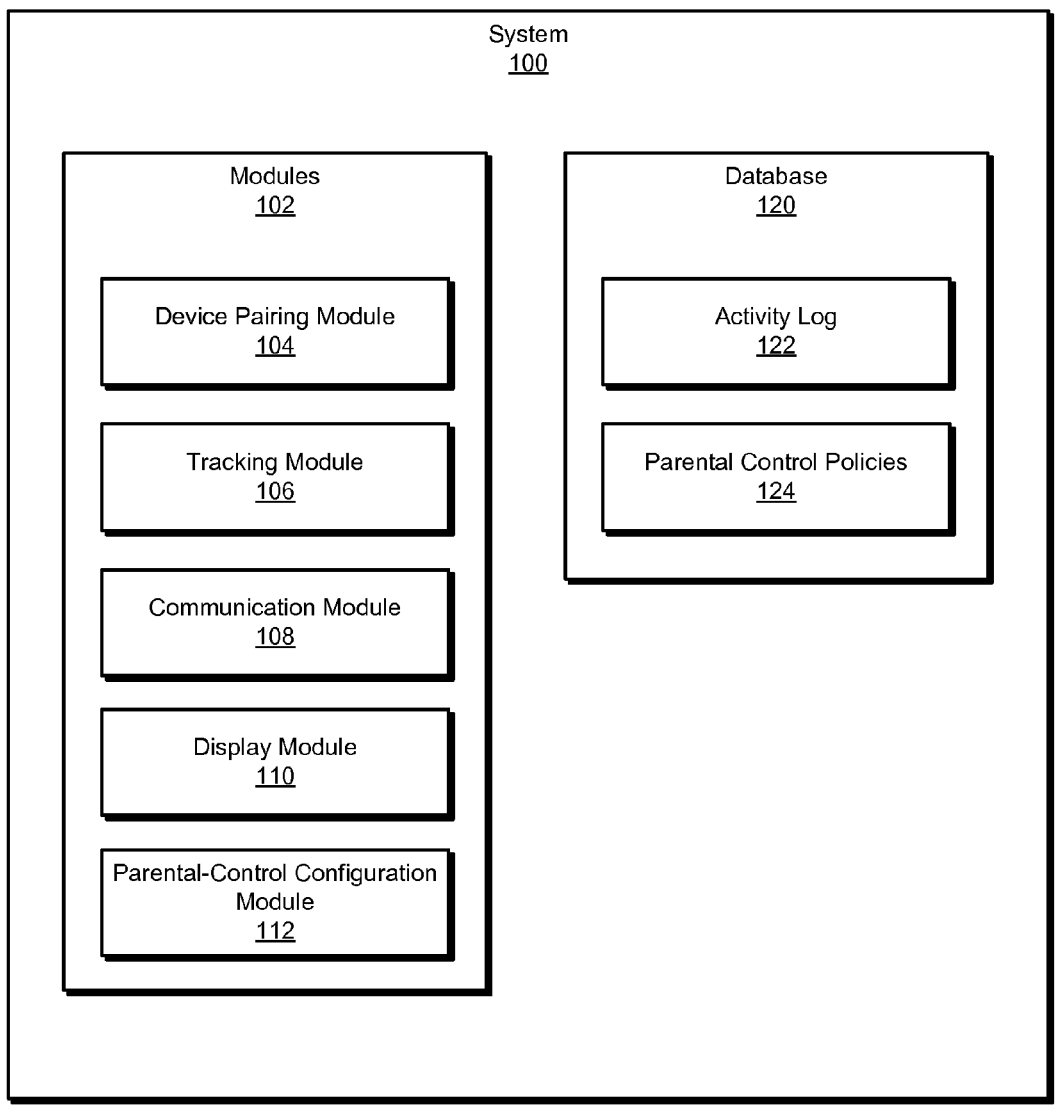
FIG. 1 is a block diagram of an exemplary system for managing parental controls.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to enabling real-time collaboration between a child and a guardian of the child to manage one or more parental control policies. For example, the parental control systems and methods described herein may enable a parent to view a child's computer activities in real-time and create, modify, and/or otherwise maintain parental controls for the child as the child performs the activities.

As noted above, traditionally parents have maintained parental-control settings by relying on blacklists, control heuristics, and/or by creating a customized set of parental controls before a child is allowed to access a computing device or resource. Some parents may also periodically check logs of a child's activities to determine whether parental controls should be updated. However, this process can be frustrating to a child because it may be difficult and take a long time for the child to gain a parent's approval to access a benign resource that is blocked by an overreaching control policy. The process can also be frustrating for a parent because the parent may not determine that a questionable resource accessed by the child should be blocked until long after the child began accessing the questionable resource.

A particularly involved parent may watch a child's computer activities over the child's shoulder. In this situation, if a parent determines that a parental control policy should be updated, the parent may need to log the child off the computer, log into the computer as the parent, and log into parental-control software before being able to update the parental control policy. This process is time-consuming, cumbersome for the parent, and frustrating for a child whose computing session has been interrupted.

Embodiments of the instant disclosure may address one or more of the foregoing issues by enabling a parent to view a child's computing activities in real-time from a remote device (i.e., a device other than the device being used by a child). Thus, a parent may be able to react to a child's computer activities as they occur and may be able to update parental control policies without taking over a child's computer and/or interrupting a child's computing session. Furthermore, embodiments of the instant disclosure may enable parents and children to interact to develop and maintain parental control policies, potentially resulting in a better experience for both the parent and the child. Various other features and advantages are also presented herein.

Figure 2:
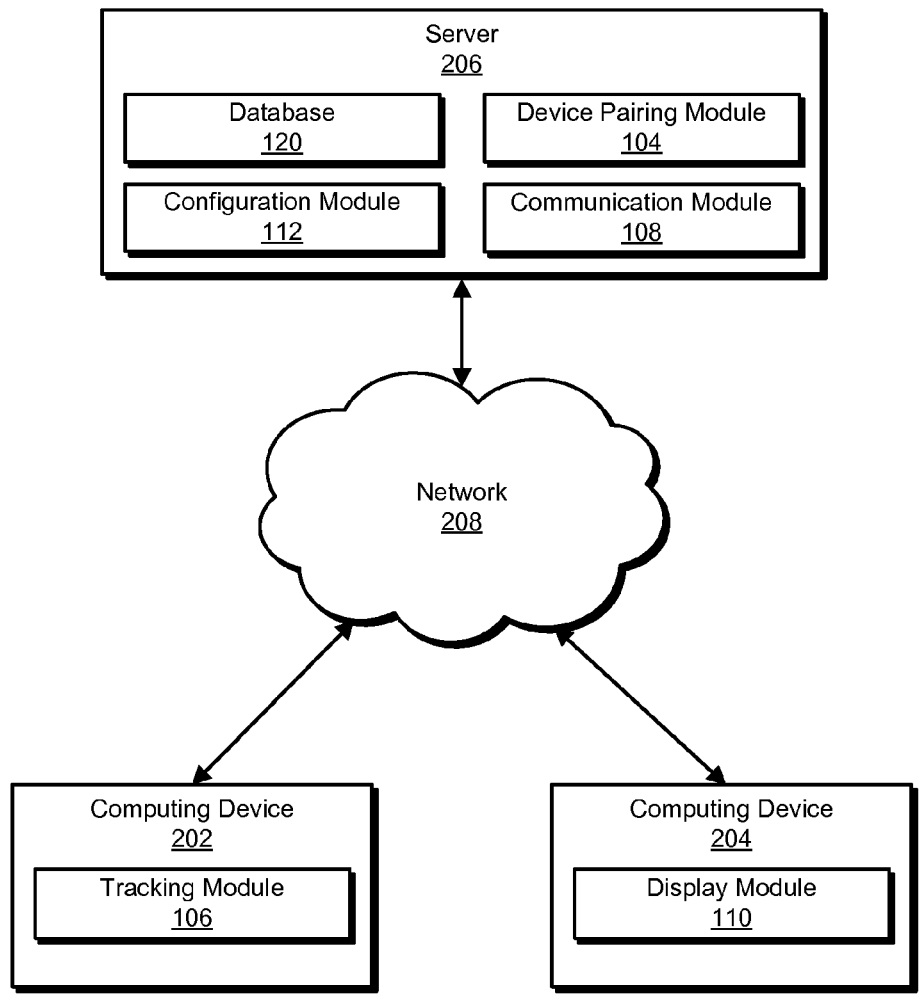
FIG. 2 is a block diagram of an exemplary system for managing parental controls.
Figure 3:
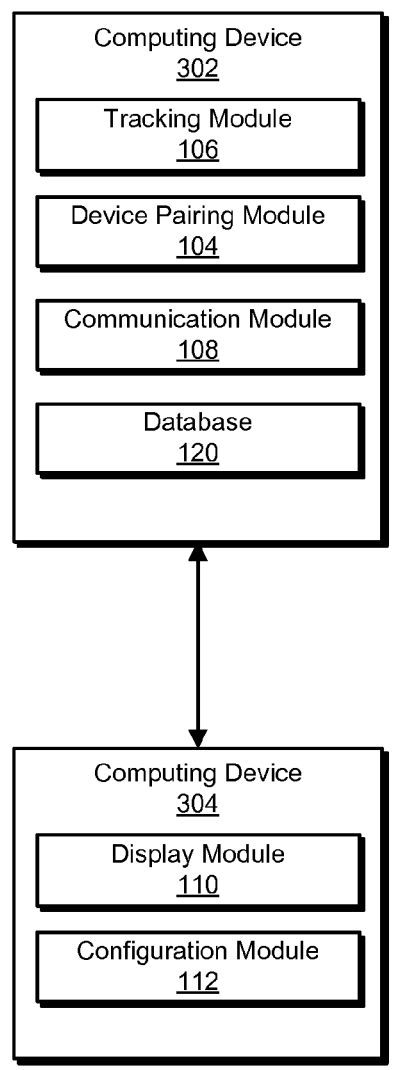
FIG. 3 is a block diagram of an exemplary system for managing parental controls.

The following will provide, with reference to FIGS. 1-3, detailed descriptions of exemplary systems for managing parental controls. Detailed descriptions of corresponding computer-implemented methods will also be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for managing parental controls. As illustrated in this figure, exemplary system 100 may include one or more modules 102 for performing one or more tasks. For example, and as will be explained in greater detail below, exemplary system 100 may include a device pairing module 104 programmed to initiate a collaborative parent-control-management session between the child and the guardian. Exemplary system 100 may also include a tracking module 106 programmed to, during the collaborative parent-control-management session, record actions the child performs on a first computing system. Exemplary system 100 may further include a communication module 108 programmed to, as the child performs the actions, stream a representation of the actions of the child to a second computing system. In addition, exemplary system 100 may include a display module 110 programmed to use the representation of the actions of the child to enable, at the second computing system, the guardian of the child to view the actions of the child as the actions occur. Exemplary system 100 may also include a parental-control configuration module 112 programmed to, during the collaborative parent-control-management session, modify the one or more parental control policies.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIGS. 2 and 3 (e.g., computing device 202, computing device 204, computing device 302, computing device 304, and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store activity log 122 for tracking activities of the child performed on a computing system. Database 120 may also include parent-control policies 124. As used herein, the phrase "parental control policies" generally refers to policies and/or settings that control access to computing information and/or resources. Parental control policies may include policies that restrict, limit, prohibit, or otherwise control activities of children. For example, parental control policies may define conditions and limitations on a child's use of particular computer resources. As another example, parental control policies may include policies that limit access to various types of objectionable content, and/or content that may be inappropriate for children of a particular age. In some embodiments, a parental control policy may set forth approved or prohibited websites. A parental control policy may also set forth permissions for a child and/or may define access control for other computer resources. A more restricted setup of parental control policies may be applied when a guardian is not present to monitor a child's computing activities, and a more permissive setup of parental control policies may be applied when a guardian is present, as described in greater detail below.

Database 120 may represent portions of a single database or computing device or a plurality of databases or computing devices. For example, database 120 may represent a portion of server 206 in FIG. 2, Computing device 302 in FIG. 3, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. FIG. 2 shows an example of implementing exemplary system 100 in a cloud-computing environment. As shown in FIG. 2, exemplary system 200 may include a computing device 202, a computing device 204, and a server 206. Computing device 202 may be a device used by a child, computing device 204 may be a device used by a guardian of the child, and server 206 may be a cloud-based parental-control server.

Computing device 202, computing device 204, and server 206 may communication over a network 208. Network 208 generally represents any medium or architecture capable of facilitating communication or data transfer. Examples of network 208 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 208 may facilitate communication or data transfer using wireless or wired connections.

As shown in FIG. 2, computing device 202 may include tracking module 106 for recording actions performed by a child on computing device 202. Server 206 may include device pairing module 104 for controlling a collaborative parent-control-management session between computing device 202 and computing device 204. Server 206 may also include communication module 108 for transmitting representations of actions of the child from computing device 202 to computing device 204. Computing device 204 may include display module 110 for enabling a guardian of the child to view actions of the child on computing device 204. As the guardian of the child views the actions of the child on computing device 204, the guardian of the child may use computing device 204 to change one or more parental control policies in database 120 by interfacing with server 206 via configuration module 112, which may allow for configuration of one or more parental control policies.

Server 206 generally represents any type or form of computing device that is capable of enforcing and/or managing parental controls. Examples of server 206 include, without limitation, application servers and database servers configured to provide various database services and/or run certain software applications.

While FIG. 2 shows an example of how embodiments of the instant disclosure may be implemented in a cloud-computing environment, embodiments of the instant disclosure may be implemented in a variety of other ways. For example, a child's computing device and a guardian's computing device may communicate directly during a real-time collaborative parent-control-management session between the child and the guardian. As shown in exemplary system 300 in FIG. 3, computing device 302 may communicate directly with computing device 304 (i.e., without communicating via a cloud-based service, an external router, etc.). Computing device 302 and computing device 304 may communicate using any suitable communication technology. For example, computing device 302 may communicate with computing device 304 via wireless communications (e.g., WIFI, Bluetooth, etc.), using near-field communications, and/or in any other suitable manner. As shown, computing device 302, which may be a device used by a child, may include tracking module 106, device pairing module 104, communication module 108, and database 120. Computing device 304, which may be a device used by a guardian of the child, may include display module 110 and configuration module 112.

Computing devices 202, 204, 302, and 304 generally represent any type or form of computing device capable of reading computer-executable instructions. Examples of computing devices 202, 204, 302, and 304 include, without limitation, laptops, desktops, servers, cellular phones, tablet computing devices, personal digital assistants (PDAs), multimedia players, embedded systems, combinations of one or more of the same, exemplary computing system 510 in FIG. 5, or any other suitable computing device.

Figure 4:
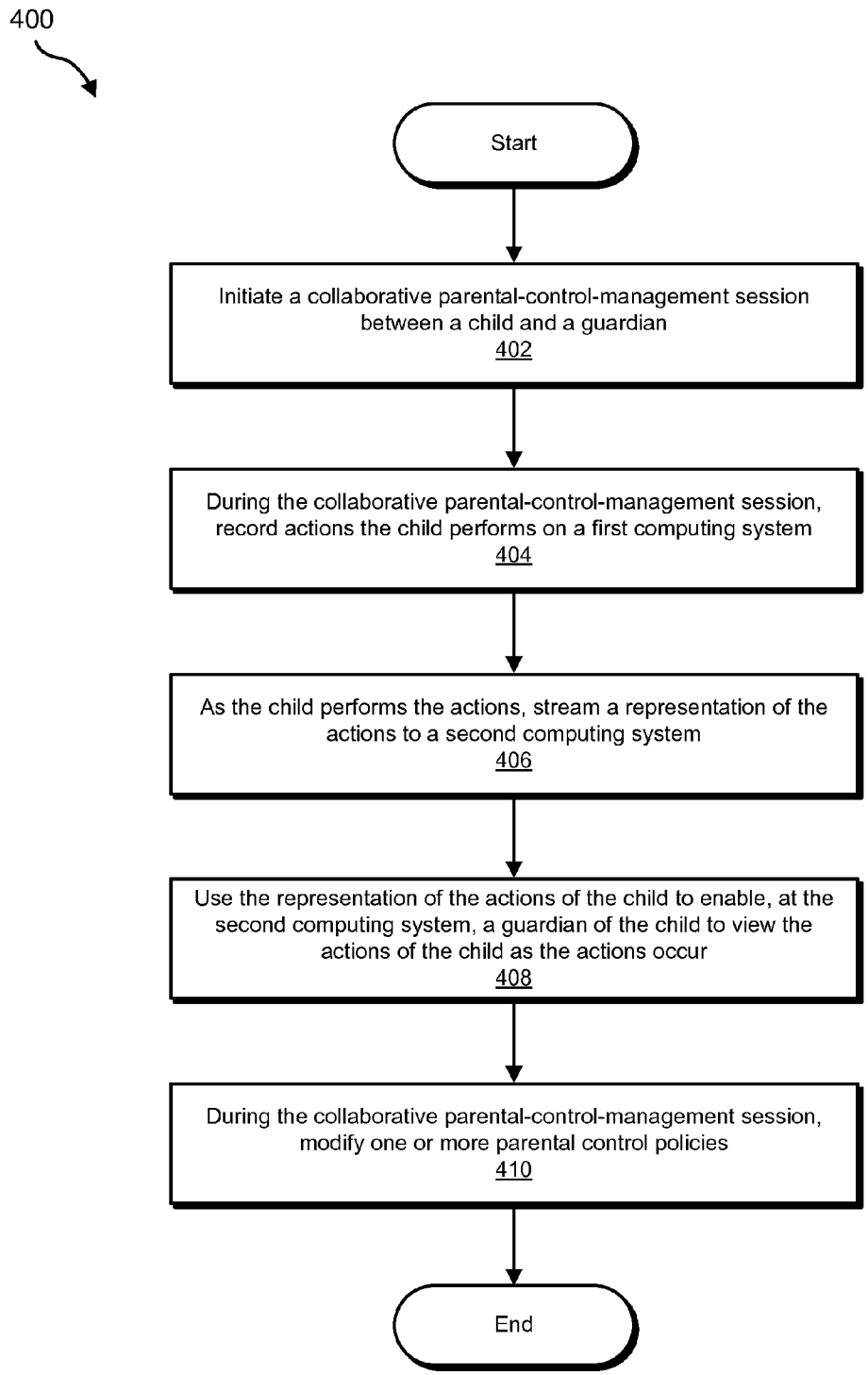
FIG. 4 is a flow diagram of an exemplary method for managing parental controls.

FIG. 4 is a flow diagram of an exemplary computer-implemented method 400 for enabling real-time collaboration between a child and a guardian of the child to manage one or more parental control policies. As used herein, the phrase "real-time collaboration" generally refers to any type or form of collaboration between a child and guardian wherein the guardian is able to view and/or respond to a child's computing activities as they occur (e.g., instantaneously, near-instantaneously, during a single computing session, during a single collaboration session, before the child logs off the computer, etc). The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, and/or system 300 in FIG. 3.

At step 402 in FIG. 4, one or more of the systems described herein may initiate a collaborative parental-control-management session between a child and a guardian of the child. As used herein, the term "child" generally refers to any individual whose actions on a computing device are controlled by one or more parental control policies. As used herein, the term "guardian" generally refers to any individual who is in some way responsible for managing, maintaining, enforcing, and/or otherwise implementing parental controls. As used herein, the term "parent" may be used interchangeably with the term "guardian."

The phrase "collaborative parental-control-management session" may generally refer to any computing session during which a child and a guardian of the child work together during a single computing session to manage one or more parental control policies governing actions of the child on a computing device. For example, a collaborative parental-control-management session may be a computing session that lasts as long as a parent is monitoring a child's computing activities and/or providing feedback to the child on his or her computing activities. In other words, a collaborative parental-control-management session may be a continuous period of time when the guardian is actively monitoring the child's activities (e.g., a co-browsing session where a guardian monitors a child's internet browsing activities). As another example, a collaborative parental-control-management session may be a period of time from when the child and/or guardian start a collaborative session until they terminate the collaborative session.

During collaborative parental-control-management sessions, a guardian may also view various types of activities performed by a child, such as a child's internet use, a child's use of software on a computing system, media (e.g., audio, video, etc.) consumed by a child, games played by a child on a computing system, and/or a child's use of any other resource of a computing system.

Collaborative parental-control-management sessions may be initiated by a parent, a child, and/or in a variety of other manners. For example, a child may use computing device 302 to initiate a collaborative parental-control-management session. Computing device 302 may then search for nearby devices to pair with. Computing device 304 may detect that computing device 302 is searching for devices to pair with and may prompt the guardian using computing device 304 to either accept or deny the session. The guardian using computing device 304 may indicate, via computing device 304, that the session is accepted and the collaborative session may then begin. In some embodiments, the child and the guardian may use a shared secret to ensure that the pairing occurs between trusted devices.

The computing devices of a child and a guardian may be paired using any suitable technology. For example, the computing devices may be paired using Bluetooth technology, WIFI technology, near-field communication technology, a hardware connection, and/or in any other suitable manner. For example, WIFI communications may be established directly between the first and second communication systems such that the first and second communication systems directly communicate with each other. As another example, a cloud-based parental-control service may pair the devices of the child and the guardian such that communications between the devices are facilitated by and/or transmitted through the parental-control service.

In some embodiments, pairing a computing system of a child with the computing system of a guardian may include authenticating the guardian and/or the child before initiating the collaborative parental-control-management session. For example, device pairing module 104 may use credentials and/or other information identifying the child and/or guardian from logging into a computing device when initiating a collaborative parental-control-management session.

At step 404 in FIG. 4, one or more of the systems described herein may, during the collaborative parental-control-management session, record actions the child performs on a first computing system. For example, tracking module 106 may, as part of computing device 202 in FIG. 2 and/or computing device 302 in FIG. 3, record actions that a child performs on computing device 202 and/or 302.

Tracking module 106 may record actions a child performs on a computing system in any suitable manner. For example, tracking module 106 may keep an activity log of actions performed by a child. Such actions may include, without limitation, browsing websites, using social networks, sending email, sending instant messages, accessing system resources (e.g., printers, projectors, hard drives, etc.), accessing software, accessing media, modifying files, playing a game, and/or interacting with a computing device in any other way. In some embodiments, tracking module 106 may record screen shots of a child's activities in addition to and/or instead of keeping activity logs of the child's activities. Tracking module 106 may record the child's screen to facilitate screen sharing with the guardian's device.

At step 406 in FIG. 4, one or more of the systems described herein may, as the child performs the actions, stream a representation of the actions to a second computing system. For example, communication module 108 (which may, as detailed above, be part of server 206 in FIG. 2 and/or computing device 302 in FIG. 3) stream a representation of the actions of the child from computing device 202 to computing device 204 and/or from computing device 302 to computing device 304. As used herein, the phrase "stream a representation of the actions of a child" generally refers to providing a sequence of information about a child's activities made available to the guardian of the child over time, as the child performs the actions.

As used herein, the phrase "representation of the actions of the child" generally refers to any log, video, image, and/or other information that relays how a child is using a computing system to a guardian of the child. For example, communication module 108 may stream a representation of the actions of the child to a second computing system by sending a stream of activity logs that track the child's activities to a second computing system, by sharing the child's screen with the second computing system such that the user of the second computing system can view the activities of a child in real-time, and/or in any other suitable manner.

Tracking module 106 and communication module 108 may track and stream actions of the child to a second computing system as the child performs actions on the first computing system. For example, tracking module 106 may record actions as they occur, or without significant delay (i.e., instantaneously, within a few seconds or minutes, sometime during the collaborative session, etc.), and communication module 108 may transmit the actions to a second computing system.

At step 408 in FIG. 4, one or more of the systems described herein may use the representation of the actions of the child to enable, at the second computing system, a guardian of the child to view the actions of the child as the actions occur. For example, display module 110 may (as part of computing device 204 in FIG. 2 and/or computing device 304 in FIG. 3) enable a guardian of the child to view the actions of the child as the actions occur. For example, display module 110 may display information that reflects the nature of the actions. Additionally or alternatively, display module 110 may display a video capture of a child's screen, still shots of a child's screen, and/or any other representation of a child's activities on a computing system. For example, display module 110 may enable a guardian of a child to view the actions of the child as they occur by enabling the guardian to view, via the second computing system, at least a portion of the screen of the child's computing system.

At step 410 in FIG. 4, one or more of the systems described herein may, during the collaborative parental-control-management session, modify one or more of the parental control policies. For example, configuration module 112 in FIG. 1 (which may, as detailed above, represent a portion of server 206 in FIG. 2 and/or computing device 304 in FIG. 3), during the collaborative parental-control-management session, may modify one or more parental control policies.

Configuration module 112 may modify one or more parental control policies in a variety of different manners. For example, configuration module 112 may receive, via the second computing system, feedback from the guardian about the actions of the child. Configuration module 112 may use the feedback from the guardian to update, change, add, delete, and/or otherwise modify one or more parental control policies.

Configuration module 112 may modify one or more parental control policies in a variety of different manners. For example, configuration module 112 may change one or more parental control policies such that the one or more parental control policies are more permissive while the guardian of the child views actions of the child via the second computing system. As an example, a child's time limits may be removed and/or extended during a collaborative parental-control-management session. As another example, during a collaborative session a child may be allowed to visit Internet websites that a child is not allowed to visit while a guardian is not participating in a collaborative parental-control-management session with the child.

In some embodiments, a parent may, in response to viewing the child's actions, create and/or modify one or more parental control policies. For example, a parent may change a policy to allow a child to visit a particular website, use a particular computing resource, and/or play a particular game on the computing device. Alternatively, a guardian may restrict the child from accessing one or more resources of the computing device. In some embodiments, the guardian may also create new parental controls and/or delete existing parental controls to modify a child's ability to access computing resources.

In certain situations, display module 110 may prompt the guardian to add or modify a parental control policy. For example, if a child accesses a website identified as containing questionable content, display module 110 may provide the guardian with information about the website (e.g., a URL of the web site, an overview of content on the website, etc.) and query the guardian about whether to allow or block access to the website. If the guardian indicates that the website should be blocked, configuration module 112 may automatically create a policy that indicates the website should be blocked going forward. In other situations, a child may request access to a blocked resource (e.g., by attempting to access the resource, by sending the guardian a request to access the resource via a parental-control system, etc.). In such situations, configuration module 112 may query the guardian about whether to change the parental control policy that governs access to the resource. Upon receiving input from the guardian, configuration module 112 may automatically update the parental control policy to reflect the input from the guardian.

In some embodiments, modifying one or more parental control policies may also involve providing feedback to a child. For example, a parent may suggest to a child and/or a child may suggest to a parent parental controls that may be more effective and/or useful (e.g., via a instant messaging or chat system built into a parental-control system). In some embodiments, a parent may react to parental control policy violations in real-time by helping guide a child to more appropriate websites and/or content. In this manner, parental control policies may be more efficiently and effectively established, modified, enforced, and/or otherwise managed.

In some embodiments, device pairing module 104 is programmed to terminate the collaborative parental-control-management session if the child's and guardian's computing devices are separated by more than a predetermined distance. Additionally or alternatively, device pairing module 104 may be programmed to terminate the collaborative parental-control-management session if the guardian's and child's devices are out of range of each other.

Figure 5:
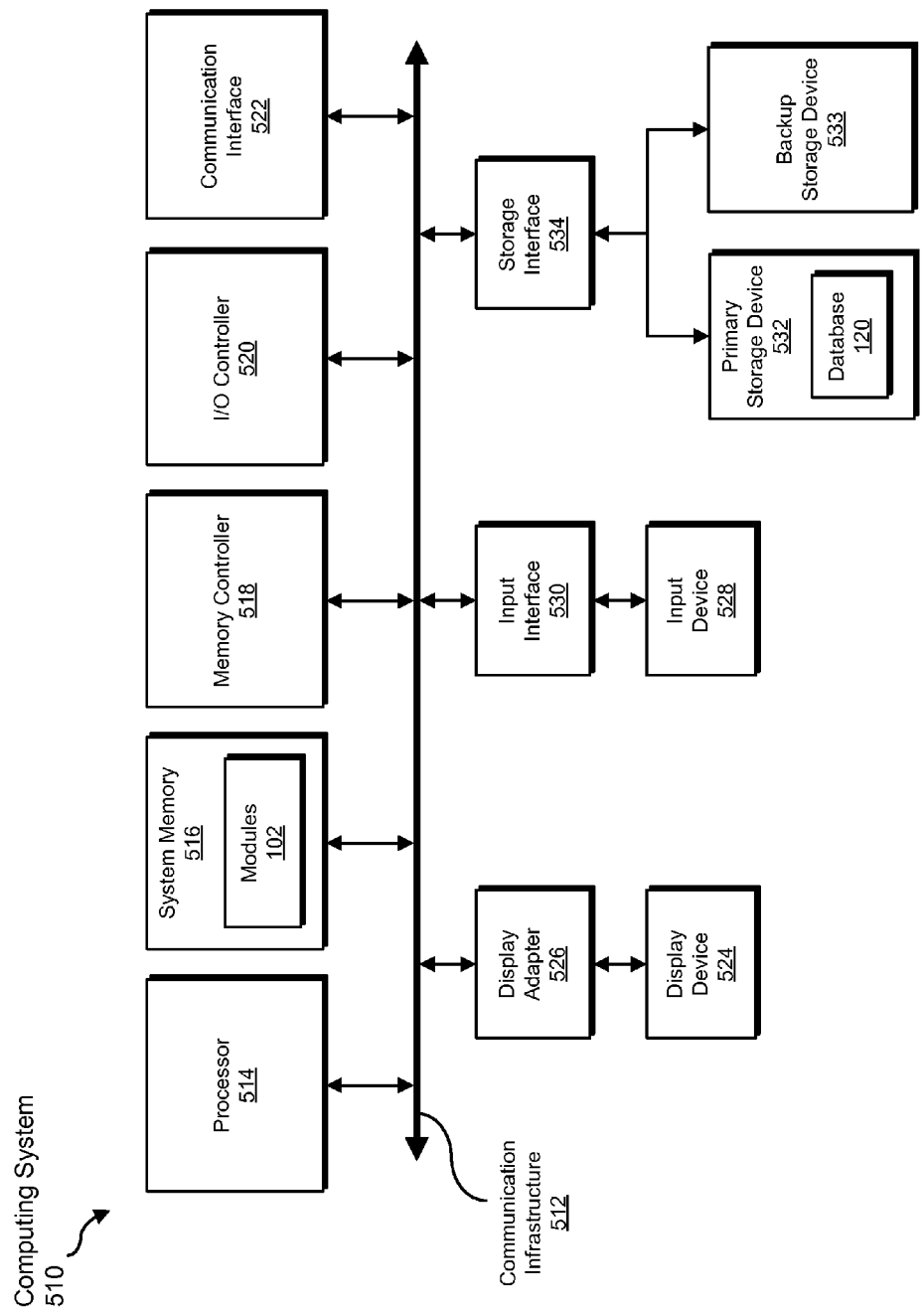
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the enabling, initiating, recording, using, modifying, receiving, changing, creating, pairing, authenticating, establishing, terminating, and/or sending steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
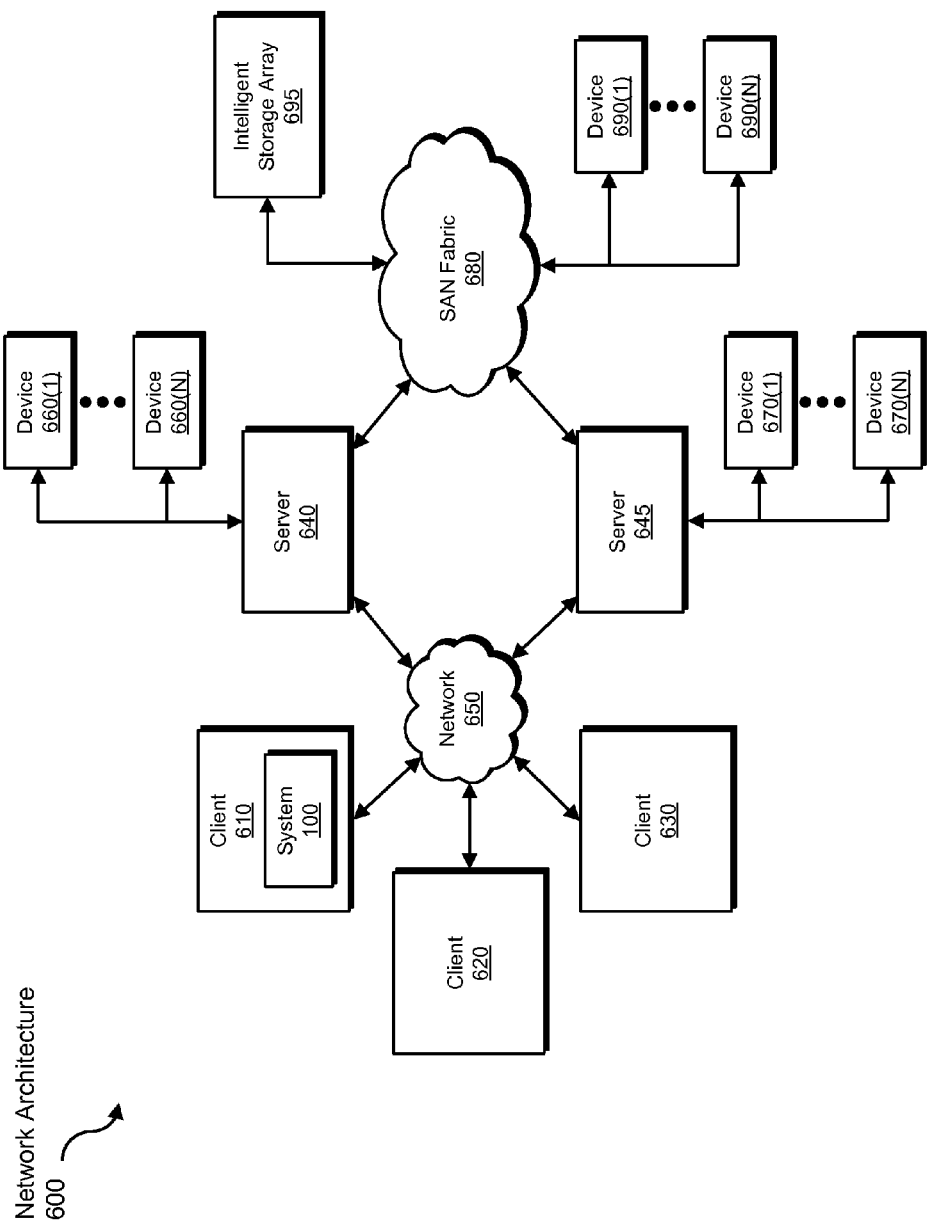
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the enabling, initiating, recording, using, modifying, receiving, changing, creating, pairing, authenticating, establishing, terminating, and/or sending steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for managing parental controls.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform two computing devices to facilitate a collaborative parental-control-management session.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing parental controls, at least a portion of the method being performed by a computing device comprising at least one processor, the method comprising:
    receiving a request to initiate a collaborative parental-control-management session between a child and a guardian of the child that enables real-time collaboration between the child and the guardian to manage one or more parental control policies that control how the child uses a first computing system, wherein the request is received from at least one of:
        the child;
        the guardian;
    initiating, in response to the request, the collaborative parental-control-management session between the child and the guardian by pairing the first computing system with a second computing system that is accessible to the guardian and separate and distinct from the first computing system;
    during the collaborative parental-control-management session:
        recording actions the child performs on the first computing system;
        as the child performs the actions, streaming a representation of the actions of the child to the second computing system;
        using the representation of the actions of the child to enable, at the second computing system, the guardian of the child to view the actions of the child as the actions occur;
        modifying the one or more parental control policies.

2. The computer-implemented method of claim 1, wherein modifying the one or more parental control policies comprises:
    receiving, at the second computing system, feedback from the guardian about the actions of the child;
    using the feedback from the guardian to modify the one or more parental control policies.

3. The computer-implemented method of claim 1, wherein modifying the one or more parental control policies comprises:
    changing the one or more parental control policies such that the one or more parental control policies are more permissive while the guardian of the child views the actions of the child on the second computing system.

4. The computer-implemented method of claim 1, wherein the collaborative parental-control-management session between the child and the guardian enables the child and the guardian to work together to manage the one or more parental control policies.

5. The computer-implemented method of claim 1, wherein pairing the first computing system with the second computing system comprises:
    authenticating the guardian and the child before initiating the collaborative parental-control-management session.

6. The computer-implemented method of claim 1, wherein pairing the first computing system with the second computing system comprises at least one of:
    establishing Bluetooth network communications between the first and second computing systems;
    establishing WIFI network communications directly between the first and second computing systems such that the first and second computing systems communicate directly with each other without sending communications through a WIFI router;
    establishing near-field communications between the first and second computing systems.

7. The computer-implemented method of claim 6, further comprising:
    terminating the collaborative parental-control-management session when the first and second computing systems are separated by more than a predetermined distance.

8. The computer-implemented method of claim 1, wherein streaming the representation of the actions of the child to the second computing system comprises sending log data that tracks the actions of the child to the second computing system.

9. The computer-implemented method of claim 1, wherein using the representation of the actions of the child to enable the guardian of the child to view the actions of the child as the actions occur comprises enabling the guardian to view, via the second computing system, at least a portion of a screen of the first computing system.

10. The computer-implemented method of claim 1, wherein modifying the one or more parental control policies comprises at least one of:
    changing the one or more parental control policies;
    creating the one or more parental control policies.

11. A system for managing parental controls, the system comprising:
    a device pairing module programmed to:
        receive a request to initiate a collaborative parental-control-management session between a child and a guardian of the child that enables real-time collaboration between the child and the guardian to manage one or more parental control policies that control how the child uses a first computing system, wherein the request is received from at least one of:
            the child;
            the guardian;

initiate, in response to the request, the collaborative parental-control-management session between the child and the guardian by pairing the first computing system with a second computing system that is accessible to the guardian and separate and distinct from the first computing system;

a tracking module programmed to, during the collaborative parental-control-management session, record actions the child performs on the first computing system;

a communication module programmed to, during the collaborative parental-control-management session and as the child performs the actions, stream a representation of the actions of the child to the second computing system;

a display module programmed to use, during the collaborative parental-control-management session, the representation of the actions of the child to enable, at the second computing system, the guardian of the child to view the actions of the child as the actions occur;

a parental-control configuration module programmed to, during the collaborative parental-control-management session, modify the one or more parental control policies;

at least one processor configured to execute the device pairing module, the tracking module, the communication module, the display module, and the parental-control configuration module.

12. The system of claim 11, wherein the parental-control configuration module is programmed to modify the one or more parental control policies by:
receiving, at the second computing system, feedback from the guardian about the actions of the child;
using the feedback from the guardian to modify the one or more parental control policies.

13. The system of claim 11, wherein the parental-control configuration module is programmed to modify the one or more parental control policies by:
changing the one or more parental control policies such that the one or more parental control policies are more permissive while the guardian of the child views the actions of the child on the second computing system.

14. The system of claim 11, wherein the collaborative parental-control-management session between the child and the guardian enables the child and the guardian to work together to manage the one or more parental control policies.

15. The system of claim 11, wherein pairing the first computing system with the second computing system comprises:
authenticating the guardian and the child before initiating the collaborative parental-control-management session.

16. The system of claim 11, wherein pairing the first computing system with the second computing system comprises at least one of:
establishing Bluetooth network communications between the first and second computing systems;
establishing WIFI network communications directly between the first and second computing systems such that the first and second computing systems communicate directly with each other without sending communications through a WIFI router;
establishing near-field communications between the first and second computing systems.

17. The system of claim 16, wherein the device pairing module is programmed to:
terminate the collaborative parental-control-management session when the first and second computing systems are separated by more than a predetermined distance.

18. The system of claim 11, wherein the communication module is programmed to stream the representation of the actions of the child to the second computing system by sending log data that tracks the actions of the child to the second computing system.

19. The system of claim 11, wherein the display module is programmed to use the representation of the actions of the child to enable the guardian of the child to view the actions of the child as the actions occur by enabling the guardian to view, via the second computing system, at least a portion of a screen of the first computing system.

20. A non-transitory computer-readable-storage medium comprising one or more computer-executable instructions that, when executed by at least one processor of a computing device, cause the computing device to:
receive a request to initiate a collaborative parental-control-management session between a child and a guardian of the child that enables real-time collaboration between the child and the guardian to manage one or more parental control policies that control how the child uses a first computing system, wherein the request is received from at least one of:
the child;
the guardian;
initiate, in response to the request, the collaborative parental-control-management session between the child and the guardian by pairing the first computing system with a second computing system that is accessible to the guardian and separate and distinct from the first computing system;
during the collaborative parental-control-management session;
record actions the child performs on the first computing system;
as the child performs the actions, stream a representation of the actions of the child to the second computing system;
use the representation of the actions of the child to enable, at the second computing system, the guardian of the child to view the actions of the child as the actions occur;
modify the one or more parental control policies.

* * * * *